United States Patent [19]
Kilbourn et al.

[11] 3,860,586
[45] Jan. 14, 1975

[54] DERIVATIVES OF 4-(2-AMINOPHENYL)-3-THIOALLOPHANIC ACID

[75] Inventors: Edward E. Kilbourn, Chalfont; William D. Weir, Levittown; Harold E. Carley, Chalfont, all of Pa.

[73] Assignee: Rohm and Haas Company, Philadelphia, Pa.

[22] Filed: Jan. 22, 1973

[21] Appl. No.: 325,277

[52] U.S. Cl............. 260/240 G, 424/263, 424/270, 424/273, 424/274, 424/275, 260/248 CS, 260/296 R, 260/306.8 A, 260/306.8 D, 260/306.8 R, 260/307 A, 260/308 R, 260/309, 260/309.2, 260/326.3, 260/455 A, 260/470, 260/566 B

[51] Int. Cl............................................ C09b 23/00

[58] Field of Search..................... 260/455 A, 240 G

[56] References Cited
FOREIGN PATENTS OR APPLICATIONS
1,214,415  12/1970  Great Britain.................. 260/455 A OTHER PUBLICATIONS
Chemical Abstracts, Vol. 73, Abst. No. 14522r, (pp. 334-335, (1970).
Dann et al., Chem. Ber., Vol. 82, pages 81 to 88, (1949).

*Primary Examiner*—John D. Randolph

[57] ABSTRACT

Heterocyclic aldehyde Schiff base derivatives of hydrocarbyl 4-(2-aminophenyl)-3-thioallophanates. These compounds are excellent fungicides and systemic fungicides in particular.

7 Claims, No Drawings

DERIVATIVES OF 4-(2-AMINOPHENYL)-3-THIOALLOPHANIC ACID

This invention is concerned with novel derivatives of 3-thioallophanic acid. These compounds are biologically active and are excellent fungicides and systemic fungicides in particular.

These novel structures may be represented by the formula

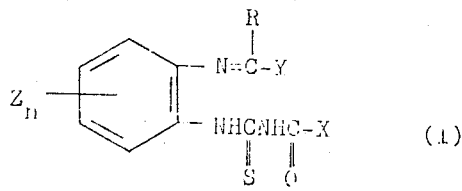

wherein X is $R^1O-$ or $R^1S-$
wherein $R^1$ is
 a. alkyl, straight or branched, of 1 to 12 carbon atoms,
 b. alkyl of 1 to 12 carbon atoms substituted with halo, preferably chloro, or methoxy groups,
 c. alkenyl of 2 to 12 carbon atoms,
 d. alkynyl of 3 to 12 carbon atoms,
 e. phenyl,
 f. phenyl substituted with halo, preferably chloro, methyl, methoxy or nitro,
 g. benzyl or
 h. benzyl substituted with halo, preferably chloro, methyl, methoxy or nitro;
Y is a heterocyclic radical of 5 or 6 members having as a hetero atom O, S or N or any combination of two of these wherein the total number of hetero atoms is up to three and the acetoxy, chloro, methyl or nitro substituted derivatives of these;
R is hydrogen or methyl;
Z is halo, preferably chloro, methyl, methoxy or nitro and
$n$ is an integer 0 to 3.

Typical heterocyclic radicals as Y groups are furyl, imidazolyl, isothiazolyl, isoxazolyl, N-methylpyrryl, oxadiazolyl, oxazolyl, pyridyl, pyrimidyl, pyrryl, thiadiazolyl, thiazolyl, thienyl, triazinyl, and triazolyl.

Preferred heterocyclic radicals include 2-furyl, 5-isothiazolyl, 1-methylpyrryl, 2-pyridyl, 2-pyrryl, 4-thiazolyl and 2-thienyl.

Among the preferred structures those most preferred are the ones wherein Y is 2-furyl or 2-thienyl and R is hydrogen and of these the preferred structure is

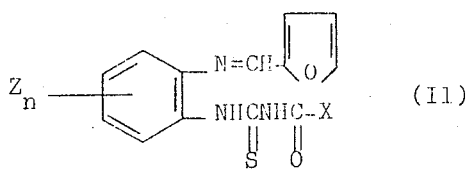

Of the hydrocarbyl radicals as defined for $R^1$, the preferred ones are alkyl groups, and of these the preferred ones are the lower alkyl groups of 1 to 6 carbons, preferably methyl or ethyl.

There is not too much known regarding related structures in the literature. There is current interest in fungicides known by the trademarked name of Topsin, such as 1,2-bis(3-methoxy(or ethoxy)carbonyl-2-thioureido)benzene. Such structures are included in Belgian Pat. 722,080 (Derwent Publications Central Patents Index basic number H-6232) for example. Biologically active compounds of the structure

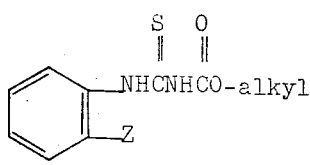

wherein Z is, among others, benzylideneamino or its chloro, methoxy or nitro-substituted derivatives are known from British Pat. 1,214,415 (Derwent number H-8890) for example.

The compounds of this invention may be synthesized by two general routes both starting with an o-phenylenediamine.

Procedure 1.

An o-phenylenediamine is reacted with a hydrocarbyloxy-carbonyl isothiocyanate to produce a 4-(2-aminophenyl)-3-thioallophanate which is then reacted with an aldehyde or ketone to give the corresponding Schiff base, i.e., a 4-(2-methyleneaminophenyl)-3-thioallophanate. The following reaction sequence depicts this. The symbols have the meanings as given above.

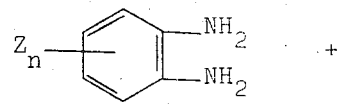

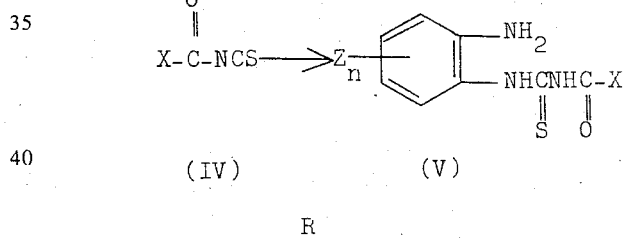

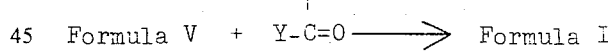

The isothiocyanates of Formula IV are readily made by literature methods. One such procedure is to react a chloroformate ester with ammonium or potassium thiocyanate in the presence of an inert solvent such as acetone, 2-methoxyethanol (glyme), ethyl acetate, butyl acetate or toluene, with heating, for example in the range of 25°–100°C. The following equation depicts such a reaction with potassium thiocyanate

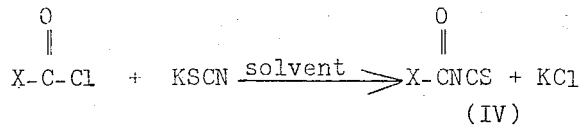

The isothiocyanate may be purified by distillation but in the process there often is considerable thermal degradation or polymerization. Accordingly it is usually preferred to use the crude isothiocyanate from the reaction, as identified by infrared analysis, for a subsequent reaction with an amine.

The reaction of an o-phenylenediamine of Formula III with an isothiocyanate of Formula IV is usually carried out with essentially equivalent amounts of reactants in the presence of an inert solvent such as ether, glyme, ethyl acetate, butyl acetate or toluene. The reaction is usually a facile one and proceeds in the temperature range of −20°C. upward quite readily. The 4-(2-aminophenyl)-3-thioallophanates of Formula V usually crystallize from the reaction mixture and are purified by common procedures such as recrystallization. Extensive heating of these compounds is to be avoided as it may lead to the formation of a benzimidazole, to wit

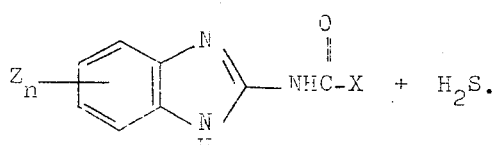

The 4-(2-aminophenyl)-3-thioallophanates are then reacted with the heterocyclic aldehyde or ketone in the presence of an inert solvent, such as an aromatic hydrocarbon, and a catalytic amount of an acid, such as p-toluenesulfonic acid. The reaction is most usually run at a reflux temperature of the solvent but often in the range of 50°–150°C. Difficulties may be encountered with acid-sensitive aldehydes, such as furfuraldehyde, and for these, revised procedures have been devised and are discussed later. A typical reaction with thiophene-2-carboxaldehyde or 2-thienyl methyl ketone is given below.

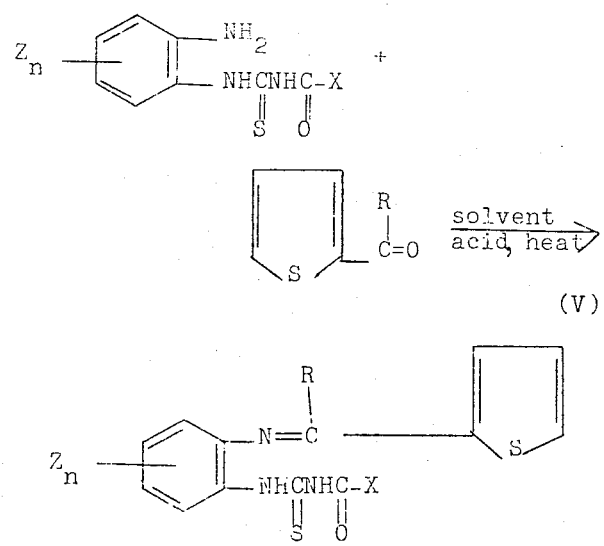

The o-phenylenediamines and the heterocyclic aldehydes and ketones are for the most part products of commerce. Other heterocyclic aldehydes or methyl ketones may be made by methods known in the literature. For example, a heterocyclic nucleus may be converted to an aldehyde by formylation with carbon monoxide or hydrogen cyanide or N-methylformanilide, by interaction of a halomethyl derivative with hexamethylenetetramine or via the Grignard reagent with ethoxymethylaniline, by hydrolysis of a dihalomethyl derivative or by reduction of an acyl halide derivative.

The following Table I lists typical compounds of Formula V useful in preparing compounds of this invention.

Table I

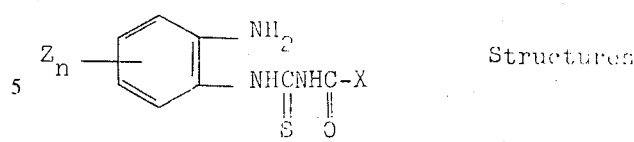

Structures

| See Example | Zn= | X= | Decomposition (d) Point (°C) or Literature References | |
|---|---|---|---|---|
| 1, etc. | H | OCH₃ | British Pat. | 1,214,415 |
| 2, etc. | H | OC₂H₅ | do. | do. |
| — | 4—CH₃ | OCH₃ | do. | do. |
| — | 5—NO₂ | OC₂H₅ | do. | do. |
| 9, etc. | 4—(or 5—)Cl | OCH₃ | 183–185(d) | |
| 10 | 4—(or 5—)CH₃ | OCH₃ | 168–170(d) | |
| 11 | 4—(or 5—)OCH₃ | OCH₃ | 184–185(d) | |
| 22 | 4—(or 5—)NO₂ | OCH₃ | 211–212(d) | |

Procedure 2.

An o-phenylenediamine is reacted with an equivalent amount of a heterocyclic aldehyde or ketone to produce an o-(methyleneamino)-aniline (Schiff base) which is subsequently reacted with the hydrocarbyloxycarbonyl isothiocyanate to give the compounds of Formula I. The reaction sequence may be depicted as follows:

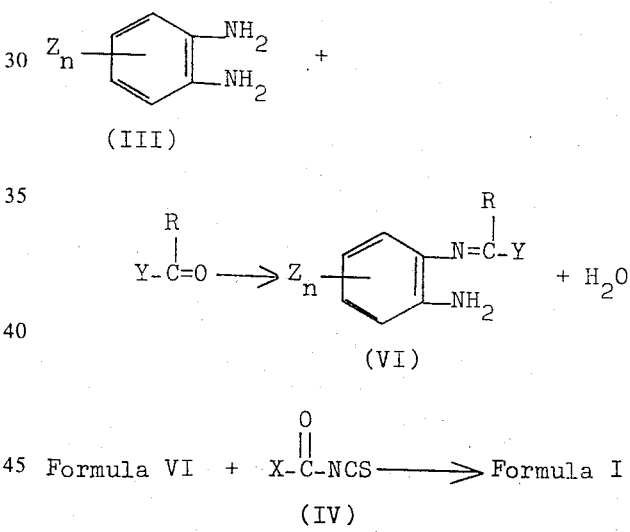

Formula VI + X-C-NCS ⟶ Formula I
(IV)

The reaction of the o-phenylenediamine with the carbonyl compound is usually run in the presence of an inert solvent such as benzene or toluene. The reaction is most usually run at the reflux temperature of the solvent but often in the range of 50°–150°C. The reaction may be promoted by removal of the water as formed. Alcohol may be used as the solvent but in this case the reaction is run at less than 0°C. For the most part these Schiff bases are known compounds.

The reaction of compounds of Formula VI with an isothiocyanate is usually run in the presence of an inert solvent such as ether, glyme, ethyl acetate, butyl acetate or toluene. The reaction proceeds readily at room temperature and in the range of −20° to 100°C.

Other standard methods may be used to produce some of the intermediates described above. For example, 2-aminonitrobenzene may be reacted with an isothiocyanate of Formula IV to produce a compound of the formula

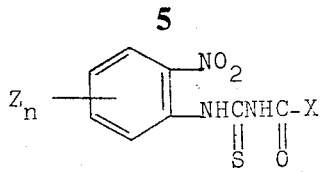

and this is then reduced, e.g., by means of a metal-acid combination, to Formula V compounds.

The following typical examples are described in order to give a more detailed depiction of how the reactions may be run, but in no way are to be construed as limiting.

EXAMPLE 1

Preparation of methyl 4-[2-(furfurylideneamino)phenyl]-3-thioallophanate

Procedure 1.

To 11 g. (0.049 mole) of methyl 4-(2-aminophenyl)-3-thioallophanate in 200 ml. of benzene was added 5.75 g. (0.06 mole) of furfural and a catalytic amount of p-toluenesulfonic acid. The reaction mixture was heated to reflux for 4 hours and 0.9 ml. of water was trapped from the azeotroping mixture. The reaction mixture was then cooled to give a yellow solid which was isolated and dried to give 8.1 g. melting with decomposition at 150°–152°C (d). This was a 55% yield of methyl 4-[2-furfurylideneamino)phenyl]-3-thioallophanate.

Procedure 2.

A slurry of potassium thiocyanate (52.4 g., 0.54 mole) in butyl acetate (162 g.) was stirred and heated to 50°–55°C. Methyl chloroformate (52.4 g., 0.565 mole) was added rapidly and gave a slight exotherm. The reaction mixture was heated to 60°C. for 4 hours as 2.6 l. of carbon dioxide was evolved as measured by a wet test meter. The resulting methoxy-carbonyl isothiocyanate mixture was cooled to 10°C. and held for a subsequent reaction.

To o-phenylenediamine (39.2 g., 0.362 mole) (the addition of 2.2 g. of N,N-dimethylaniline is optional) was added furfural (37.0 g., 0.385 mole) in toluene (119 g.). The reaction mixture was warmed to 35°C. for 0.5 hour to give a solution and was then evacuated to 50 mm. pressure as 93 g. of a toluene-water distillate was collected. The remaining o-(2-furfurylideneamino)aniline residue was cooled to ambient temperature and triethylamine (3.0 g.) was added.

To the above methoxycarbonyl isothiocyanate mixture at 10°C. was added triethylamine (7g.) and then the above o-(2-furfurylideneamino)aniline slowly so as to maintain the temperature at less than 35°C. The reaction mixture was then stirred 1 hour and then cooled to 10°C. and the solid filtered off. The solid was then washed with 100 ml. of cold toluene and 300 ml. of water, then dried to give 100 g. of yellow solid melting at 155°–156°C. This is a 90% yield of methyl 4-[2-(furfurylideneamino)phenyl]-3-thioallophanate.

British Pat. 1,214,415 gives in Example 11 a method for preparing 1-benzylideneamino-2-(3-methoxycarbonyl-2-thioureido)-benzene. This involves reacting methoxycarbonyl isothiocyanate with 2-benzylideneamino aniline in acetone at −5°C. to room temperature. Following this procedure with o-(2-furfurylideneamino)aniline, no 4-[2-(furfurylideneamino)-phenyl]-3-thioallophanate could be isolated. Likewise this product was not formed when triethylamine was omitted. The use of a base is necessary when reactions of acid-sensitive aldehydes or their Schiff bases are involved.

EXAMPLE 3

Preparation of ethyl 4-[2-(furfurylideneamino)phenyl]-3-thiothiolallophanate.

To a slurry of potassium thiocyanate (20 g., 0.206 mole) in 125 ml. of glyme at room temperature was added S-ethyl chlorothiolformate (25 g., 0.2 mole). After stirring three hours that reaction mixture was stripped of solvent. To this was added triethylamine (3 g.) and then this was reacted with o-(2-furfurylideneamino)aniline (0.185 mole) containing about 3 g. of triethylamine by the procedure of Example 1. The product was isolated as for the compound of Example 1 and was 24.5 g. of yellow solid. A recrystallization from benzene gave 14.3 g. of yellow needles melting with decomposition at 157°–158°C.(d). This was a 23% yield of ethyl 4-[2-(furfurylideneamino)-phenyl]-3-thiothiolallophanate.

EXAMPLE 17

Preparation of methyl 4-[2-(thenylideneamino)phenyl]-3-thioallophanate

A reaction mixture consisting of methyl 4-(2-aminophenyl)-3-thioallophanate (4.5 g., 0.02 mole), thiophene-2-carboxaldehyde (2.24 g., 0.02 mole) and 100 ml. of benzene was stirred at reflux temperature for 48 hours and water was collected from the azeotropic distillate. The cooled reaction mixture was filtered to remove the product as 3.5 g. of solid residue melting with decomposition at 175°C.(d). This was a 55% yield of methyl 4-[2-(thenylideneamino)phenyl]-3-thioallophanate.

EXAMPLE 20

Preparation of methyl 4-[2-(thenylideneamino)-4(or 5)-chlorophenyl]-3-thioallophanate.

To 4-chloro-o-phenylenediamine (10 g., 0.07 mole) in 175 ml. ether was added methoxycarbonyl isothiocyanate (8 g., 0.068 mole) at less than 25°C. A slurry resulted and this was filtered and the solid residue dried to give 12.3 g. of yellow solid melting at 184°–185°C. with decomposition. A second crop of 6.1 g. was recrystallized from glyme to give 4.3 g. melting at 183°–185°C. The combined product was a 92% yield of methyl 4-(2-amino-4(or 5)-chlorophenyl)-3-thioallophanate.

To methyl 4-(2-amino-4(or 5)-chlorophenyl)-3-thioallophanate (6 g., 0.023 mole) in 250 ml. of benzene was added 2-thiophenecarboxaldehyde (2.8., 0.025 mole) containing about 0.2 g. of p-toluenesulfonic acid. The reaction mixture was refluxed 6 hours as water was azeotroped out. The solvent was removed leaving an orange-brown residue which was triturated with ether to give 4 g. of orange-yellow solid melting with decomposition at 173°–175°C.(d). Analysis indicated the product to be a mixture so it was further reacted with 3 g. of 2-thiophenecarboxylic aldehyde as above. The product isolated as above was 3.3 g. of orange-yellow solid melting with decomposition at 183°–4°C (d). This was a 41% yield of methyl 4-[2-(thenylideneamino)-4-(or 5)chlorophenyl]-3-thioallophanate.

EXAMPLE 21

Preparation of methyl 4-[2-(thenylideneamino)-4(or 5)chlorophenyl]-3-thioallophanate To a mixture of 4-chloro-o-phenylenediamine (9.5 g., 0.067 mole) in 250 ml. of benzene was added 2-thiophenecarboxaldehyde (7.5 g., 0.067 mole). The mixture was refluxed 3 hours then stripped to one-half volume, 25 ml. of hexane added and cooled to give an oil. The oil was separated and concentrated but was found to be a mixture. It was reacted with 2.5 g. more of 2-thiophenecarboxaldehyde at reflux temperature for 2 hours, then cooled to give a solid which after isolation and drying was 4.1 g. From the filtrate was isolated 3.2 g. of oily solid. The solids were combined and recrystallized from hexane/ether (50:50) to give 5.2 g. of solid melting at 69°–70°C. This is a 33% yield of 2-thenylideneamino-4(or 5)-chloroaniline.

To 2-thenylideneamino-4(or 5)chloroaniline (4 g., 0.017 mole) in 120 ml. of ether was added methoxycarbonyl isothiocyanate (2 g., 0.017 mole) and the mixture stirred 1 hour at room temperature. The resulting yellow solid was filtered off, washed with ether and dried to give 1.8 g. of solid melting with decomposition at 143°–144°C. (d). This is a 30% yield of methyl 4-[2-(thenylideneamino)-4(or 5) chlorophenyl]-3-thioallophanate.

EXAMPLE 23

Preparation of methyl 4-[2-(α-methyl-2-thenylideneamino)-phenyl]-3-thioallophanate A reaction mixture consisting of o-phenylenediamine (15 g., 0.139 mole), 2-acetylthiophene (19 g., 0.151 mole) and 200 ml. of benzene was heated at reflux for 56 hours as the water of reaction was trapped. The solvent was removed to give a yellow solid residue. This was triturated with hexane and then recrystallized from benzene/hexane (1:1) to give 15.4 g. of 2-(α-methyl-2-thenylideneamino)aniline.

To a solution of 2-(α-methyl-2-thenylideneamino)-aniline (5 g., 0.0232 mole) in 175 ml. of ether was added dropwise methoxycarbonyl isothiocyanate (3g., 0.0256 mole) at a temperature range of 24°–28°C. The resulting yellow solution was stripped of solvent to give an oily solid. This was triturated with cold ether and filtered to give 2 g. of solid melting at 126°–127°C with decomposition. This is a 26% yield of methyl 4-[2-(α-methyl-2-thenylideneamino)phenyl]-3-thioallophanate.

EXAMPLE 24

Preparation of methyl 4-[2-(2-pyrrolylmethyleneamino)phenyl]-3-thioallophanate

A solution of o-phenylenediamine (15 g., 0.139 mole) in 45 ml. of methanol was cooled to −10°C. To this was added at less then −5° C a solution of pyrrole-2-carboxaldehyde (13.2 g., 0.139 mole) in 45 ml. of methanol. The reaction mixture was stirred 0.5 hr. at less than −5°C as a yellow precipitate formed. The solid was filtered off to give 10.5 g. melting at 106°–108°C and the filtrate upon further standing gave 12.4 g. melting at 106°–108°C. The combined solids were an 89% yield of 2-(2-pyrrolylmethyleneamino)-aniline.

To a solution of 2-(2-pyrrolylmethyleneamino)-aniline (5 g., 0.027 mole) in 175 ml. of ether was added methoxycarbonyl isothiocyanate (3.7 g., 0.315 mole) and the mixture was stirred 1 hour. The resulting solid was filtered off and dried to give 5.1 g. of orange-yellow solid melting at 178°–179°C with decomposition. This is a 63% yield of methyl 4-[2-(2-pyrrolylmethyleneamino)phenyl]-3-thioallophanate.

EXAMPLE 25

Preparation of methyl 4-[2-(1-methyl-2-pyrrolylmethyleneamino)phenyl]-3-thioallophanate A mixture of o-pheneylenediamine (10 g., 0.0926 mole), N-methylpyrrole-2-carboxaldehyde (10.1 g., 0.0926 mole) and 175 ml. of benzene was refluxed 1 hour as water was removed, then stripped of solvent to give a dark oil residue. This oil was triturated twice with 100 ml. of hot hexane and the hexane extracts cooled to give 10.2 g. of a yellow oil. This yellow oil was dissolved in 100 ml. of ether, which would be 0.05 mole of 2-(1-methyl-2-pyrrolylmethylamino)-aniline if pure. Seventy ml. of this solution (0.035 mole) was reacted with methoxycarbonyl isothiacyanate (5 g., 0.043 mole) to give a solid. This was 4.1 g. melting at 155°–157°C and was found to be a mixture of the desired product and methyl 4-(2-aminophenyl)-3-thioallophanate. This solid (3.8 g.) was suspended in 175 ml. of benzene containing 0.1 g. of p-toluenesulfonic acid and further reacted with N-methylpyrrole-2-carboxaldehyde (3 g., 0.095 mole) by refluxing for 3 hours. The reaction mixture was then treated with charcoal in the hot for 0.5 hour, filtered and the filtrate stripped of solvent to give an oily solid. This was triturated with ether to give 2.4 g. of solid melting at 171°–172°C with decomposition. The product was a 22% yield of methyl 4-[2-(1-methyl-2-pyrrolylmethyleneamino)phenyl]-3-thioallophanate.

EXAMPLE 26

Preparation of methyl 4-[2-(5-isothiazolylymethyleneamino)-phenyl]-3-thioallophanate A reaction mixture consisting of o-phenylenediamine (9.4 g., 0.0867 mole), 5-isothiazolecarboxaldehyde (9.8 g., 0.0867 mole) and 80 ml. of benzene was refluxed 2 hours as the water of reaction was trapped. The solvent was removed to give a red-orange oily residue. This was triturated with 100 ml. of cooled ether/hexane (1:1) to give 9.1 g of a red-orange solid. Infrared confirmed that this was a 52% yield of 2-(5-isothiazolylmethyleneamino)aniline.

To a solution of 2-(5-isothiazolylmethyleneamino)-aniline (5 g., 0.0246 mole) in 100 ml. of ether was added methoxycarbonyl isothiocyanate (3.5 g., 0.03 mole) and the mixture stirred 1 hour. A red-orange solid precipitated and was filtered off and dried to give 3.5 g., melting at 176°–177°C. with decomposition. This was a 46% yield of methyl 4-[2-(5-isothiazolylmethyleneamino)phenyl]-3-thioallophanate.

EXAMPLE 27

Preparation of methyl 4-[2-(2-pyridylmethyleneamino)phenyl]-3-thioallophanate

A reaction mixture consisting of methyl 4-(2-aminophenyl)-3-thioallophanate (7.1 g., 0.0316 mole), 2- pyridinecarboxaldehyde (3.7 g., 0.0346 mole), 0.2 g. p-toluenesulfonic acid and 250 ml. of benzene was refluxed for 3 hours. Cooling gave a tan solid byproduct which was filtered off and amounted to 3.2 g. The filtrate was treated with 150 ml. of hexane to give 4.3 g. of a purplish solid melting at 144°–145°C. with decomposition. This was a 43% yield of methyl 4-[2-(2--pyridylmethyleneamino)phenyl-3]-thioallophanate.

Tables II, III, IV and V give the identity of typical compounds prepared and physical and analytical data for them.

TABLE II

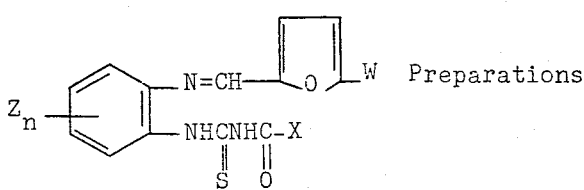 Preparations

| Example | X | W | Z |
|---------|---|---|---|
| 1 | OCH₃ | H | H |
| 2 | OC₂H₅ | H | H |
| 3 | SC₂H₅ | H | H |
| 4 | OC₄H₉—n | H | H |
| 5 | OC₈H₁₇—n | H | H |
| 6 | OC₆H₅ | H | H |
| 7 | OCH₃ | CH₃ | H |
| 8 | OCH₃ | CH₃C(O)OCH₂ | H |
| 9 | OCH₃ | H | 4 (or 5)—Cl |
| 10 | OCH₃ | H | 4 (or 5)—CH₃ |
| 11 | OCH₃ | H | 4 (or 5)—OCH₃ |
| 12 | OCH₃ | H | 4,5—Cl₂ |
| 13 | OCH₃ | NO₂ | H |
| 14 | OCH₂CCl₃ | H | H |
| 15 | OCH₂CH=CH₂ | H | H |
| 16 | OCH₂C₆H₅ | H | H |

TABLE III

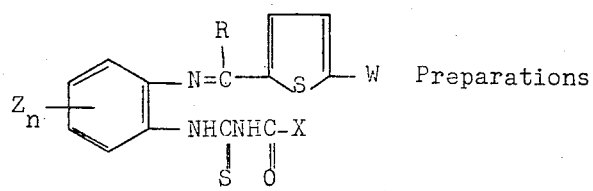 Preparations

| Example | R | X | W | Z |
|---------|---|---|---|---|
| 17 | H | OCH₃ | H | H |
| 18 | H | OC₂H₅ | H | H |
| 19 | H | OCH₃ | Cl | H |
| 20 | H | OCH₃ | H | 4 (or 5)—Cl |
| 21 | H | OCH₃ | H | 4 (or 5)—Cl |
| 22 | H | OCH₃ | H | 4 (or 5)—NO₂ |
| 23 | CH₃ | OCH₃ | H | H |

TABLE IV

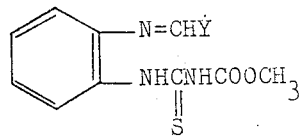 Preparations

| Example | Y |
|---------|---|
| 1 | 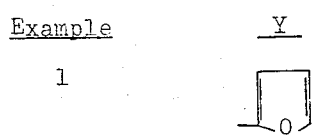 |
| 17 | 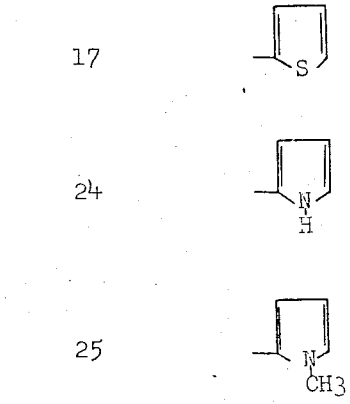 |
| 24 | |
| 25 | |
| 26 |  |
| 27 |  |

TABLE V

| Example | Melting Point (°C)(d)* | Empirical Formula | Analysis** | | | | |
|---------|------------------------|-------------------|---|---|---|---|---|
| | | | C | H | N | O | S |
| 1 | 155–6(d) | C₁₄H₁₃N₃O₃S | 55.5(55.3) | 4.3(4.4) | 13.9(13.8) | 15.9(16.0) | 10.6(10.5) |
| 2 | 113–115(d) | C₁₅H₁₅N₃O₃S | 56.9(57.2) | 4.8(4.8) | 13.3(13.1) | 15.1(15.2) | 10.1(9.8) |
| 3 | 157–158(d) | C₁₅H₁₅N₃O₂S₂ | 54.0(54.0) | 4.5(4.7) | 12.6(12.7) | 9.6(10.1) | 19.2(19.3) |
| 4 | 122–124(d) | C₁₇H₁₉N₃O₃S | 59.2(58.9) | 5.6(5.9) | 12.2(12.1) | 13.9(14.1) | 9.3(9.4) |
| 5 | 84–85(d) | C₂₁H₂₇N₃O₃S | 62.4(62.8) | 6.6(6.3) | 10.4(10.5) | 12.2(12.0) | 8.1(8.0) |
| 6 | 172–173(d) | C₁₉H₁₅N₃O₃S | 62.5(62.7) | 4.1(4.2) | 11.5(11.8) | 13.1(13.3) | 8.2(8.5) |
| 7 | 127–128(d) | C₁₅H₁₅N₃O₃S | 56.8(57.4) | 4.8(4.8) | 13.2(13.3) | 15.2(15.6) | 10.1(10.0) |
| 8 | 149–150 | C₁₇H₁₇N₃O₅S | 54.4(54.3) | 4.5(4.6) | 11.2(11.2) | 21.3(21.6) | 8.6(8.5) |
| 9 | 188–189 | C₁₄H₁₂ClN₃O₃S | 49.6(49.6) | 3.6(3.5) | 12.5(12.2) | 14.3(14.6) | 9.5(9.5) |
| 10 | 168–169(d) | C₁₅H₁₅N₃O₃S | 56.8(57.0) | 4.8(4.9) | 13.3(13.1) | 15.2(15.1) | 10.1(9.8) |
| 11 | 163–164(d) | C₁₅H₁₅N₃O₄S | 54.0(54.4) | 4.6(4.7) | 12.6(12.5) | 19.2(19.3) | 9.5(9.6) |
| 12 | 202–203 | C₁₄H₈Cl₂N₃O₃S | 45.5(45.6) | 2.1(2.7) | 11.4(11.2) | 13.2(13.2) | 8.6(8.8) |
| 13 | 206–208(d) | C₁₄H₁₂N₄O₅S | 48.2(48.6) | 3.5(3.4) | 16.1(16.0) | 23.0(22.9) | 9.2(8.9) |
| 14 | 166–167(d) | C₁₅H₁₂Cl₃N₃O₃S | 42.8(43.0) | 2.9(3.0) | 10.0(9.8) | 11.4(11.4) | 7.6(7.9) |
| 15 | 108–110(d) | C₁₆H₁₅N₃O₃S | 58.3(58.3) | 5.2(4.6) | 12.9(12.8) | 15.0(14.6) | 8.9(8.7) |

TABLE V – Continued

| Example | Melting Point (°C)(d)* | Empirical Formula | Analysis** | | | | |
|---|---|---|---|---|---|---|---|
| | | | C | H | N | O | S |
| 16 | 161–162(d) | $C_{20}H_{17}N_3O_3S$ | 62.0(63.1) | 4.5(4.5) | 10.7(11.1) | 13.0(12.7) | (8.5) |
| 17 | 163–165(d) | $C_{14}H_{13}N_3O_2S_2$ | 52.7(52.4) | 4.1(4.2) | 13.2(13.2) | | |
| 18 | 136–137(d) | $C_{15}H_{15}N_3O_2O_2S_2$ | 54.1(53.1) | 4.5(4.4) | 12.6(12.8) | 9.6(10.0) | 19.2(19.3) |
| 19 | 149–151(d) | $C_{14}H_{12}ClN_3O_2S_2$ | 47.7(47.5) | 3.4(3.5) | 11.9(11.8) | 9.1(9.3) | 18.1(18.0) |
| 20 | 183–184(d) | $C_{14}H_{12}ClN_3O_2S_2$ | 47.6(47.6) | 3.4(3.5) | 11.9(11.4) | 9.0(9.9) | 18.1(18.0) |
| 21 | 143–144(d) | $C_{14}H_{12}ClN_3O_2S_2$ | 47.7(47.6) | 3.4(3.1) | 11.9(11.7) | 9.0(9.7) | 18.1(17.7) |
| 22 | 203–204(d) | $C_{14}H_{12}N_4O_4S$ | 46.2(45.7) | 3.3(3.6) | 15.4(15.5) | 17.6(17.7) | |
| 23 | 126–127(d) | $C_{15}H_{15}N_3O_2S_2$ | 54.0(54.0) | 4.5(4.5) | 12.6(12.5) | 9.6(9.9) | 19.3(19.4) |
| 24 | 178–179(d) | $C_{14}H_{14}N_4O_2S$ | 55.7(56.2) | 4.7(4.4) | 18.5(19.0) | 10.6(10.6) | 10.6(10.5) |
| 25 | 171–172(d) | $C_{15}H_{16}N_4O_2S$ | 57.0(57.2) | 5.1(5.0) | 17.8(17.4) | 10.0(10.6) | 10.0(10.0) |
| 26 | 176–177(d) | $C_{13}H_{12}N_4O_2S_2$ | 48.7(48.9) | 3.8(3.9) | 17.5(17.4) | 10.0(9.8) | 20.0(19.8) |
| 27 | 144–145(d) | $C_{15}H_{14}N_4O_2S$ | 57.3(57.0) | 4.5(4.5) | 17.9(17.8) | 10.2(10.1) | 10.2(10.5) |

* With decomposition
** The number in parenthesis represents the theoretical value as calculated from the empirical formula The 4-(2-methyleneaminophenyl)-3-thioallophanates of this invention are excellent fungicides. They are particularly useful for the control of phytopathogenic fungi belonging to the Ascomycetes and Fungi Imperfecti groups. The following genera of phytopathogenic fungi are examples of the types of fungi which should be capable of being controlled: Acanthorhynchus; Acanthostigma; Acremonium; Acrostalagmus; Ascospora; Aspergillus, e.g. *A. oryzae, A. repens*, and *A. terreus;* Botryosphaeria; Botryosporium; Botrytis, e.g. *B. cinerea;* Calonectria; Calosphaeria; Cenangium; Cephalosporium; Cephalothecium; Ceratostomella; Cercospora, e.g. *C. apii;* Cercosporella; Claviceps; Cleistothecopsis; Coccomyces; Cryptosporella; Dasyschypha; Diaporthe; Didymaria; Didymellina; Didymosphoeria; Dothidella; Endothia; Epichloe; Erysiphe, e.g. *E. graminis*, and *E. polygoni;* Fabraea; Fusidium; Gibberella; Gloedsprium; e.g. *G. aridum, G. fagi, G. musarum*, and *G. quercinum;* Glomerella, e.g. *G. cingulata*, and *G. gossypii;* Gnomonia; Guignardia; Herpotrichia; Hyalodema; Hypoderma; Hypodermella; Hypoxylon; Keithia; Leptosphaeria; Lophodermium; Meliola; Microsphaera; Monilia; Monilinia, e.g. *M. fructicola;* Mycogone; Mycosphaerella; Nectria, e.g. *N. epiphaeria;* Neofabraea; Neopeckia; Nummullaria; Oidiopsis; Oidium; Oospora; Ophiobolus; Penicillium, e.g. *P. diversum, P. funiculosum, P. italicum, P. oxalicum* and *P. vernaculosum;* Phabdocline; Phacidiella; Phyllactinia; Phyllachora; Physalospora; Piricularia, e.g. *P. oryzae;* Plectodiscella; Pleosphaerulina; Pleospora; Plowrightia; Podosphaera; Pseudopeziza; Pyrenopeziza; Pyrenophora; Quvlaria; Ramularia; Rhytisma; Rosellinia; Rhizina; Sclerotinia, e.g. *S. sclerotiorium* Septocylindrium; Sphaerotheca, e.g. *S. fuliginea;* Sphoerulina; Sterigmatocystis; Taphrina; Thielavia; Titea; Trochila; Tricholadia; Trichosphoeria; Uncinula; Ustilaginoidea; Valsa; Venturia; Verticillium, e.g. *V. alboatrum*.

These 4-(2-methyleneaminophenyl)-3-thioallophanates display a high degree of systemic fungicidal activity, that is these fungicides are capable of protecting a plant from fungal attack internally as well as externally. A discussion of how systemic fungicides may function can be found in World Review of Pest Control 2 (3), 1963, wherein examples of this type action with phenylthiosemicarbazides are given. Systemic fungicide development in the decade following the above article may be found in PANS 18 (1), 1972. This article reviews the systemic fungicidal properties, among others, of benzimidazoles and related structures such as certain 3-thioallophanates.

The fungicides of this invention may be applied to seed, foliage or soil. As systemic fungicides they are particularly effective when applied as soil drenches.

In evaluating these compounds a preliminary fungicidal evaluation was carried out using the compounds at 300 ppm and spraying the plants to run off in a carrier volume of about 150 gallons/A. The spray solution or suspension was made by dissolving a weighed amount of the candidate fungicide in a 50:50 mixture of acetone and methanol and then adding an equal volume of water.

The general procedure for the fungicidal tests was to take potted plants in proper condition of growth for susceptibility to the plant diseases to be evaluated, to spray these on a moving belt and allow to dry. The proper plants were then inoculated with the respective fungal spores and then allowed to incubate until the disease symptoms had developed and the disease control read or estimated. The percent disease control was reported by the following rating system:

A = 97–100% control
B = 90–96% control
C = 70–89% control
D = 50–70% control
E = Inactive, < 50% control The plants and diseases used in this investigation are given in Table VI. The disease control on the preliminary evaluation are given in Table VII.

Table VI

PLANT DISEASES EVALUATED IN PRELIMINARY TEST

| Fungal Disease | Plant (Age) | Incubation period and temperature |
|---|---|---|
| (inoculum/spores ml.) | | |
| 1) botrytis blight *Botrytis cinerea* (150,000) | faba bean (10 days) *Vicia faba* | 3 days (80–82°F.) |

Table VI — Continued

PLANT DISEASES EVALUATED IN PRELIMINARY TEST

| Fungal Disease | Plant (Age) | Incubation period and temperature |
|---|---|---|
| (inoculum/spores ml.) | | |
| 2) bean powdery mildew *Erysiphe polygoni* (10-25,000) | dwarf bean (2 wks.) *Phaseolus vulgaris* | 10 days (ambient) |
| 3) rice blast *Piricularia oryzae* (10-25,000) | rice (2 wks.) *Oryza sativa* | 1 day* + 5-8 days (80-82°F.) |
| 4) tomato late blight *Phytophthora infestans* (50-60,000) | tomato (3 wks.) *Lycopersicum esculentum* | 1.5-2 days (55°F.) 2-3 days (70°F.) |
| 5) grape downy mildew *Plasmopora viticola* (150,000) | grape seedling (3-4 leaf stage) *Vitis vinifera* | 2 days (70°F.)* 4 days (ambient) 1 day (70°F.)* |
| 6) barley helminthosporium *Helminthosphorium teres* (10-15,000) | barley (6 days) *Hordeum vulgare* | 1 day (80°F.) 3-4 days (75°F.) |
| 7) cercospora blight *Cercospora apii* (25,000) | celery (6-8 wk. transplants) *Apium graveolens* | 1 day (80°F.)* 14-18 days (ambient) |
| 8) wheat leaf rust *Puccinia recondita* (60,000) | wheat (6 days) *Triticum vulgare* | 1 day (70°F.)* 6-8 days ambient) *high humidity |

TABLE VII

Disease Control Level at 300 ppm

| Example | B. cinerea | E. polygoni | P. oryzae | P. infestans | P. viticola | H. teres | C. apii | P. recondita |
|---|---|---|---|---|---|---|---|---|
| 1 | A | A | A | E | E | E | A | D |
| 2 | A | A | E | B | — | E | — | B |
| 3 | A | A | A | E | — | E | — | C |
| 4 | A | A | B | E | — | E | — | D |
| 5 | E | B | E | — | — | E | — | E |
| 6 | A | A | B | E | — | E | — | E |
| 7 | A | A | A | E | — | E | — | B |
| 8 | A | A | B | E | — | E | — | C |
| 9 | D | A | E | E | — | E | — | D |
| 10 | A | A | B | E | — | E | — | D |
| 11 | B | A | B | E | — | E | — | D |
| 12 | E | C | E | E | — | E | — | E |
| 13 | B | A | A | E | — | B | — | E |
| 14 | A | A | A | E | — | E | — | C |
| 17 | A | A | B | E | E | E | — | D |
| 18 | B | A | B | E | — | E | — | D |
| 19 | A | A | B | E | — | E | — | C |
| 20 | B | A | E | E | — | E | — | B |
| 21 | D | A | E | E | — | E | — | D |
| 22 | C | E | E | E | — | E | — | E |
| 23 | B | A | C | E | E | E | — | A |
| 24 | B | A | B | E | E | E | — | D |
| 25 | A | A | C | E | — | E | — | A |
| 26 | B | A | A | E | E | E | — | D |
| 27 | B | A | C | E | — | E | — | C |

Using certain of the above examples as typical of the invention, secondary and special tests were then run as described below.

A. Dose/response studies.

1. Bean powdery mildew.

A known amount of the candidate fungicides was dissolved in acetone and diluted with deionized water containing 0.05 ml. of an emulsifier classified as a modified phthalic glycerol alkyl resin per 100 ml. of water. The concentration was adjusted to give 25 ppm and this stock solution was diluted by subsequent doubling of volumes to give a range of serial dilutions down to 1.5 ppm. Dwarf horticultural bean seedlings were sprayed until drip-off with the variously concentrated sprays using two replicates per treatment. The bean plants were allowed to dry for 20 hours and then were inoculated with a spore suspension of *Erysiphe polygoni* containing $2 \times 10^4$ spores per ml. The inoculated plants and controls were then maintained in a greenhouse at 75°-80°F. for 10 days. The number of mildew lesions present were then counted, and the percent disease control was calculated by the formula $$\text{Disease Control} = \frac{\text{no. of lesions on control} - \text{no. of lesions on treatment}}{\text{no. of lesions on control}} \times 100$$

The results are given in Table VIII.

Table VIII

Dose/Response on Bean Powdery Mildew
% Disease Control at ppm.

| Ex. | 25 | 12.5 | 6.2 | 3.1 | 1.5 |
|---|---|---|---|---|---|
| 1 | 100 | 98.4 | 94.6 | 96.1 | 95.7 |
| 2 | 99.5 | 95.3 | 86.6 | 36.6 | 0 |
| 3 | 97.9 | 98.4 | 83.1 | 85.5 | — |
| 4 | 91.7 | 63.9 | 29.7 | 34.0 | — |
| 6 | 0 | 0 | 0 | 0 | — |
| 7 — | 100 | 100 | 100 | 95.5 | — |
| 8 | 100 | 100 | 98.4 | 92.1 | — |
| 9 | 98.8 | 86.6 | 68.8 | 0 | 0 |
| 10 | 87.3 | 75.9 | 30.3 | 39.8 | — |
| 11 | 100 | 94.9 | 96.8 | 49.3 | — |
| 12 | 91.6 | 85.0 | 82.1 | 0 | — |
| 17 | 100 | 98.8 | 95.7 | 92.7 | 91.5 |
| 18 | 100 | 98.0 | 79.3 | 78.1 | 0 |
| 19 | 100 | 100 | 100 | 96.2 | — |
| 20 | 95.2 | 96.2 | 86.7 | 80.5 | — |
| 21 | 94.8 | 87.5 | 62.6 | 0 | — |
| 22 | 91.6 | 0 | 0 | 0 | — |
| 23 | 100 | 100 | 100 | 96.8 | — |
| 24 | 100 | 100 | 100 | 94.3 | — |
| 25 | 100 | 100 | 98.1 | 96.2 | — |
| 26 | 100 | 100 | 98.8 | 97.7 | 89.7 |
| 27 | 99.0 | 98.5 | 95.0 | 79.8 | 53.7 |

2. Cucumber powdery mildew.

Cucumber seedlings, having two well developed primary leaves and a small third primary leaf, were sprayed until drip-off with varied concentrations of methyl 4-[2-(furfurylideneamino)phenyl]-3-thioallophanate (Example 1). The plant foliage was allowed to dry for several hours and then inoculated with a spore suspension of *Sphaerotheca fuliginea* containing approximately $2 \times 10^4$ ascospores per ml. They were immediately placed in a greenhouse at 75°–80°F. and 11 days after the application of the chemical the disease had developed enough to be read and the percent disease control was calculated. The results were:

| Compound | 50 | 25 | % Disease Control at 12.5 | 6.3 | 3.1 | 1.6 ppm |
|---|---|---|---|---|---|---|
| Example 1 | 100 | 100 | 99.6 | 97.9 | 94.3 | 72.5 |

B. Residual activity after weathering.

A measure of the weatherability of the fungicides of this invention was made by taking some of the test plants after application of the chemical and raining on them with 1 inch of simulated rain before inoculating with the phytopathogenic fungal spores.

The following results were obtained with various plant diseases (Table IX).

plastic pots. The compound of Example 17 was dissolved in acetone:methanol:water (1:1:2) and the concentration adjusted so that 15 ml. of the spray strength solution contained a predetermined dosage in parts per million (ppm) which was used to water the plants by soil drenching. The treated rice seedlings were maintained under standard greenhouse conditions at about 80°F. for 8 days. They were then inoculated with *P. oryzae* spores and the percent disease control was read 6 days later. The following results were obtained:

| Example | ppm in Soil Drench | % Disease Control |
|---|---|---|
| 17 | 150 | 91.7 |
|  | 300 | 98.0 |

2. Cucumber powdery mildew (*Sphaerotheca fuliginea*)

Cucumber seedlings, having two well developed leaves and growing in 3-inch plastic pots, were watered with 15 cc of a solution containing varied parts per million (ppm) of the compound of Example 17. The seedlings were then inoculated by foliar application with a spore suspension of *S. Fuliginea* containing $2 \times 10^4$ ascospores per ml. The inoculated plants were immediately placed in the greenhouse at 85° – 90°F. and were periodically observed for disease development. The following results were obtained:

| Example | ppm in soil drench | Disease Control Level 6 weeks after soil drench |
|---|---|---|
| 17 | 125 | E |
|  | 250 | E |
|  | 500 | A |

As another measure of the duration of systemic activity, the cucumber plants used in the weathering test described in Part B, Table IX, above, were retained and periodically observed for cucumber powdery mildew control. The following observations were made:

| Example | Weeks After Foliar Chemical Application | Minimum effective concentration (ppm) to provide >50% mildew control | |
|---|---|---|---|
|  |  | without rain | with rain |
| 17 | 3 | 150 | <75 |
|  | 4 | 150 | 600 |
|  | 5 | 300 | 600 |

Table IX

Weathering Studies on Example (17) with Various Diseases
Disease Control Level

| Disease | (lbs./100 gallons) | | | | | | | |
|---|---|---|---|---|---|---|---|---|
|  | 1/16 | | 1/8 | | 1/4 | | 1/2 | |
|  | rain without | with | rain without | with | rain without | with | rain without | with |
| Botrytis on Faba Bean | B | E | B | C | A | B | A | A |
| Bean Powdery Mildew | A | B | A | B | A | A | A | A |
| Rice Blast | C | E | C | E | B | E | B | C |
| Cucumber Powdery Mildew | B | A | B | A | B | A | B | A |
| Celery Cerospora | A | A | A | A | — | — | — | — |
| Wheat Powdery Mildew | C | B | B | A | — | — | — | — |

C. Systemic Tests by Root Uptake.

1. Rice blast (*Piricularia oryzae*)

Rice seedlings, 1 – 3 inches tall, were grown in 3-inch

The compounds of this invention will provide good disease control at low dosages in excess of 5 weeks after a foliar or a soil drench application.

3. Wheat powdery mildew (*Erysiphe graminis*)
   a. By soil drench

Wheat plants, 5 – 7 days old, and growing in plastic pots, were trimmed to a height of 1.5 – 2 inches and the soil drenched with 15 ml. of a water solution containing the compound of Example 17 as typical of the compounds of this invention. The plants were then placed in the greenhouse at about 75°F. for 2 days and then inoculated by shaking the spores from wheat plants infected with powdery mildew over them. The disease incidence was recorded 6 days after inoculation. The following results were obtained:

| Example | Disease Control Level at | |
|---|---|---|
| | 10 ppm | 20 ppm |
| 17 | C | C |
| Control | (E) | | b. By seed treatment

Wheat seed was treated with varying dosages of the compound of Example 17 by shaking 40 g. of seed in a jar with 1 ml. of acetone plus 0.5 ml. of water with an amount of the compound calculated to give 0.5, 1, 2 or 4 oz. per cwt. The treated seeds were planted in soil in 2.5 inch pots, using 4 replicates per treatment. The pots were placed in a greenhouse at 70° – 75°F. until the seedlings had attained a height of about 2 inches. The plants were inoculated by applying a spore suspension of E. graminis containing ca. 30,000 spores/ml. The plants were dried and then placed in the greenhouse at 70° – 75°F. to allow the disease to develop. Seventeen days from the time of planting the amount of disease was read and the Disease Control Level determined with the following results:

| Treatment | Disease Control Level | | | |
|---|---|---|---|---|
| | 0.5 oz. | 1 oz. | 2 oz. | 4 oz./cwt. |
| Example 17 | C | D | D | C |
| Control | (E) | | | |

D. Eradication Tests.

Cucumber seedlings in the two-leaf stage of development were inoculated with a spore suspension of *Sphaerotheca fuliginea* containing approximately $2 \times 10^4$ ascospores per ml. Forty-eight hours later the plants were sprayed with a dosage series of the test compound. Ten days later the amount of the disease was determined by counting the lesions present and the percent eradication calculated by comparison with the number of lesions on untreated plants. The following gives typical results:

| Treatment | ppm applied to foliage | % Eradication |
|---|---|---|
| Example 1 | 25 | 100 |
| | 12.5 | 100 |
| | 6.3 | 100 |
| Example 17 | 25 | 100 |
| | 12.5 | 100 |
| | 6.3 | 100 |
| Untreated | | 0 |

E. Control of fruit storage rots, such as nectarine brown rot (*Monilinia fructicola*), with postharvest dips.

For an evaluation by a postharvest chemical dip type application, partially ripe nectarines were injured by bruising and then immediately immersed into a 300 or 600 ppm solution of the test compound dissolved in acetone:methanol:water (1:1:2). The fruit was allowed to dry at room temperature and then inoculated with a $30 \times 10^3$ spore suspension of *Monilinia fructicola*. The fruit was then maintained at 75° and 58°F., until brown rot appeared in the control treatments. The following control was obtained:

| | | % Disease | | |
|---|---|---|---|---|
| Example | Chemical Dip (ppm) | 76°F. 1 wk. after inoculation | 58°F. 1 wk. | 58°F. 2 wk. |
| 1 | 300 | 1.4 | 0 | 0 |
| | 600 | 1.6 | 0 | 0 |
| Control | | 4.0 | 4.0 | 23.0 |

F. Comparisons with Prior Art Compounds.

Several comparisons were made between the compound of Example 1 and prior art compounds from British Patent No. 1,214,415. The following are representative of some of the results obtained:

1. Control of rice blast (*Piricularia oryzae*)

Rice seedlings were treated by foliar application with the candidate compounds at varying concentrations given as parts per million (ppm) and inoculated with the rice blast disease as described above.

Direct comparisons were made with the following compounds of British Patent 1,214,415:

| Compound | Name |
|---|---|
| A | 1-Benzylidenamino-2-(3-methoxycarbonyl-2-thioureido)-benzene |
| B | 1-(4-Chlorobenzylidenamino)-2-(3-methoxycarbonyl-2-thioureido)-benzene |
| C | 1-(4-Methoxybenzylidenamino)-2-(3-methoxycarbonyl-2-thioureido)-benzene |
| D | 1-(3-Nitrobenzylidenamino-2-(3-ethoxycarbonyl-2-thioureido)-benzene |

The following results were obtained:

| Treatment | Disease Control Level at | | | | | |
|---|---|---|---|---|---|---|
| | 1200 | 600 | 300 | 150 | 75 | 37.5 |
| Example 1 | A | A | A | A | B | B |
| Compound A | C | D | E | E | E | E |
| do. B | C | D | D | E | E | E |
| do. C | A | B | B | D | E | E |
| do. D | B | C | D | E | E | E |
| Untreated | (F) | | | | | |

2. Zone of Inhibition Tests with Various Fungal Organisms.

Twenty cc. of potato-dextrose agar (PDA) was placed in a 9 cm. plastic disposable plate. The candidate fungicides were made up into varying concentrations of solutions. A 6.35 mm. antibiotic disc was submerged in each individual solution and then placed in the center of the agar plate. On opposite sides, at the edge of the Petriplate, mycelial mats of several fungi were placed on the surface of the agar. The plates were then held under conditions for promoting the growth of the respective organism. Within 3 to 6 days thereafter, the amount of growth was recorded and the zone of inhibition measured. The index used to determine the degree of inhibition is as follows:

+++ strong
++ moderate
+ weak
− none

Comparisons were made with compounds of British Patent 1,214,415, i.e., Compounds A − D described above. Table XI gives the results:

TABLES XI

| Treatments | ppm in bioassay disk | Inhibition of Fungal Growth For: | | | |
|---|---|---|---|---|---|
| | | Aspergillus terreus | Fusarium roseum "Culmorum" | Sclerotinia sclerotiorum | Zythia binastria |
| Example 1 | 1,000 | +++ | +++ | +++ | |
| | 500 | +++ | − | +++ | ++ |
| | 250 | +++ | − | +++ | ++ |
| | 125 | + | − | − | + |
| Example A | 1,000 | +++ | + | +++ | +++ |
| | 500 | ++ | − | +++ | ++ |
| | 250 | − | − | + | + |
| | 125 | − | − | − | + |
| Example B | 1,000 | − | − | − | − |
| | 500 | − | − | − | − |
| | 250 | − | − | − | − |
| Example C | 1,000 | ++ | − | ++ | − |
| | 500 | + | − | + | − |
| | 250 | + | − | − | − |
| Compound D | 1,000 | + | + | − | − |
| | 500 | + | − | − | − |
| | 250 | − | − | − | − |

G. The Influence of Fungicide Applications on Grape Juice Fermentation.

It is desirable that a fungicide used on grapes should not influence the rate of fermentation of grape juice used in wine making.

A study was made in this regard on the influence of the compound of Example 17 in comparison with the well known fungicide folpet, N-trichloromethylthiophthalimide. For this test, a fermentation media consisting of 3785 ml. of grape juice and 454 g. of glucose was divided into 200 cc. aliquots and placed into pint jars which contained sufficient amounts of the experimental compounds dissolved in acetone: water (1:1:2) to provide dilutions of 5 and 20 ppm of the fungicide. One ml. of a yeast (Saccromyces cerevisiae) suspension containing 3 × 10$^7$ cells per ml. were added to each treatment and the jars were stoppered with cork containing glass and tygon tubing. The unattached end of the tygon tubing was inserted into an inverted 4 oz. jar filled with tap water. Carbon dioxide was evolved, and the data recorded as the amount of time required to produce 125 ml. of $CO_2$. The following results were obtained;

TABLE XII

| Fungicide | ppm | Hours required to Produce 125 ml. of $CO_2$ |
|---|---|---|
| Example 17 | 5 | <24 |
| | 20 | <24 |
| folpet | 5 | >120 |
| | 20 | >120 |
| Check | − | <24 |

The compounds of this invention have never shown any phytotoxicity when sprayed on plants at dosages which give excellent control of phytopathogenic fungi.

The compounds of this invention have never shown any insecticidal or miticidal activity and accordingly, would not harm predatory insects.

The compounds of this invention possess anthelmintic activity. For example, they have demonstrated good to excellent control of the pinworms Aspicularis tetraptera and Syphacia obvelata.

The 4-(2-methyleneaminophenyl)-3-thioallophanates of this invention are useful as agricultural fungicides and as such may be applied to various loci such as the seed, the soil or the foliage. For such purposes these 3-thioallophanates may be used in the technical or pure form as prepared, as solutions or as formulations. The compounds are usually taken up in a carrier or are formulated so as to render them suitable for subsequent dissemination as pesticides. For example, these thioallophanates may be formulated as wettable powders, emulsifiable concentrates, dusts, granular formulations, aerosols, or flowable emulsion concentrates. In such formulations, the compounds are extended with a liquid or solid carrier and, when desired, suitable surfactants are incorporated.

It is usually desirable, particularly in the case of foliar spray formulations, to include adjuvants, such as wetting agents, spreading agents, dispersing agents, stickers, adhesives and the like in accordance with agricultural practices. Such adjuvants commonly used in the art may be found in the John W. McCutcheon, Inc. publication "Detergents and Emulsifiers 1971 Annual."

In general, the compounds of this invention are somewhat limited in solubility but they may be dissolved in certain solvents such as dimethylformamide, pyridine or dimethyl sulfoxide and such solutions extended with water. The concentration of the solution may vary from 2% to 50% with a preferred range being 5 to 25%.

For the preparation of emulsifiable concentrates, the compound may be dissolved in suitable organic solvents, or a mixture of solvents, together with an emulsifying agent which permits dispersion of the pesticide in water. The concentration of the active ingredient in emulsifiable concentrates is usually 10% to 25% and in flowable emulsion concentrates, this may be as high as 75%.

Wettable powders suitable for spraying, may be prepared by admixing the compound with a finely divided solid, such as clays, inorganic silicates and carbonates, and silicas and incorporating wetting agents, sticking agents, and/or dispersing agents in such mixtures. The concentration of active ingredients in such formulations is usually in the range of 20% to 98%, preferably 40% to 75%. A typical wettable powder was made by blending 50 parts of the compound of Example 1, 45 parts of a synthetic precipitated hydrated silicon dioxide sold under the trademark Hi-Sil, and 5 parts of sodium lignosulfonate (Marasperse N-22). In another preparation a kaolin type (Barden) clay was used in place of the Hi-Sil in the above wettable powder, and in another such preparation 25% of the Hi-Sil was replaced with a synthetic sodium silico aluminate sold under the trademark Zeolex 7.

Dusts are prepared by mixing the 3-thioallophanates with finely divided inert solids which may be organic or inorganic in nature. Materials useful for this purpose include botanical flours, silicas, silicates, carbonates and clays. One convenient method of preparing a dust is to dilute a wettable powder with a finely divided carrier. Dust concentrates containing 20% to 80% of the active ingredients are commonly made and are subsequently diluted to 1% to 10% use concentration.

The 3-thioallophanates can be applied as fungicidal sprays by methods commonly employed, such as conventional high-gallonage hydraulic sprays, low gallonage sprays, air-blast spray, aerial sprays and dusts. The dilution and rate of application will depend upon the type of equipment employed, the method of application and diseases to be controlled, but the effective amount is usually 0.1 lb. to 25 lbs. per acre of the active ingredient.

As a seed protectant, the amount of toxicant coated on the seed is usually at a dosage rate of about 0.1 to 20 ounces per hundred pounds of seed. As a soil fungicide, the chemical may be incorporated in the soil or applied to the surface usually at a rate of 0.1 to 25 lbs. per acre. As a foliar fungicide, the toxicant is usually applied to growing plants at a rate of 0.25 to 10 pounds per acre.

Fungicides which may be combined with the fungicides of this invention include:
a. dithiocarbamates and derivatives such as:
   ferric dimethyldithiocarbamate (ferbam)
   zinc dimethyldithiocarbamate (ziram),
   maganese ethylenebisdithiocarbamate (maneb) and
   its coordination product with zinc ion (mancozeb),
   zinc ethylenebisdithiocarbamate (zineb),
   zinc propylenebisdithiocarbamate (propineb),
   sodium methyldithiocarbamate (metham),
   tetramethylthiuram disulfide (thiram),
   complex of zineb and polyethylene thiuram disulfide 3,5-dimethyl-1,3,5-2H-tetrahydrothiadizine-2-thione (dazomet);
   and mixtures of these and mixtures with copper salts;
b. nitrophenol derivatives such as:
   dinitro-(1-methylheptyl)phenyl crotonate (dinocap),
   2-sec-butyl-4,6-dinitrophenyl 3,3-dimethylacrylate (binapacryl), and
   2-sec-butyl-4,6-dinitrophenyl isopropyl carbonate;
c. heterocyclic structures such as:
   N-trichloromethylthiotetrahydro-phthalimide (captan),
   N-trichloromethylthiophthalimide (folpet),
   2-heptadecyl-2-imidazoline acetate (glyodin),
   2-octylisothiazolone-3,
   2,4-dichloro-6-(o-chloroanilino)-s-triazine,
   diethyl phthalimidophosphorothioate,
   4-butyl-1,2,4-triazole,
   5-amino-1-[bis(dimethylamino)phosphinyl]-3-phenyl-1,2,4-triazole,
   5-ethoxy-3-trichloromethyl-1,2-4-thiadiazole,
   2,3-dicyano-1,4-dithiaanthraquinone (dithianon),
   2-thio-1,3-dithio-[4,5-b]quinoxaline (thioquinox),
   methyl 1-(butylcarbamoyl)-2-benzimidazole carbamate (benomyl),
   2-(4'-thiazolyl)benzimidazole (thiabendazole),
   4-(2-chlorophenylhydrazono)-3-methyl-5-isoxazolone,
   pyridine-2-thiol-1-oxide,
   8-hydroxyquinoline acid and metal salts
   2,3-dihydro-5-carboxanilido-6-methyl-1,4-oxathiin-4,4-dioxide,
   2,3-dihydro-5-carboxanilido-6-methyl-1,4-oxathiin,
   α-(phenyl)-α-(2,4-dichlorophenyl)-5-pyrimidinylmethanol (triarimol),
   cis-N-[1,1,2,2-tetrachloroethyl)thio]-4-cyclohexene-1,2-dicarboximide,
   3-[2-(3,5-dimethyl-2-oxycyclohexyl-2-hydroxy]glutarimide (cycloheximide), and dehydroacetic acid;*

*N-(1,1,2,2-tetrachloroethylthio)-3a,4,7,7a-tetrahydrophthalimide (captafol)
5-butyl-2-ethylamino-4-hydroxy-6-methylpyrimidine (ethirimol)
acetate of 4-cyclododecyl-2,6-dimethylmorpholine (dodemorph),
6-methyl-2-oxo-1,3-dithiolo[4,5-b]-quinoxaline (quinomethionate).

d. miscellaneous halogenated fungicides such as:
   tetrachloro-p-benzoquinone (chloranil),
   2,3-dichloro-1,4-naphthoquinone (dichlone),
   1,4-dichloro-2,5-dimethoxybenzene(chloroneb),
   3,5,6-trichloro-o-anisic acid (tricamba),
   2,4,5,6-tetrachloroisophthalonitrile, (TCPN)
   2,6-dichloro-4-nitroaniline (dichloran)
   2-chloro-1-nitropropane,
   polychloronitrobenzenes such as:
   pentachloronitrobenzene (PCNB) and tetrafluorodichloroacetone;
e. fungicidal antibiotics such as:
   griseofulvin,
   kasugamycin and
   streptomycin;
f. copper-based fungicides such as:
   cuprous oxide,
   basic cupric chloride,
   basic copper carbonate,
   copper naphthenate, and
   Bordeaux mixture; and
g. miscellaneous fungicides such as:
   diphenyl,
   dodecylguanidine acetate (dodine),
   phenylmercuric acetate
   N-ethylmercuri-1,2,3,6-tetrahydro-3,6-endomethano-3,4,5,6,7,7-hexachlorophthalimide,
   phenylmercuric monoethanolammonium lactate,
   p-dimethylaminobenzenediazo sodium sulfonate, methyl isothiocyanate,
1-thiocyano-2,4-dinitrobenzene
1-phenylthiosemicarbazide,
nickel-containing compounds,
　calcium cyanamide,
　lime sulfur,
　sulfur, and 1,2-bis(3-methoxycarbonyl-2-thioureido)benzene (thiophanate-methyl)

We claim:
1. A compound of the structure

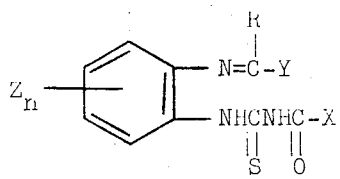

wherein X is $R^1O—$ or $R^1S—$
$R^1$ is
a. alkyl, straight or branched, of 1 to 12 carbon atoms,
b. alkyl of 1 to 12 carbon atoms substituted with halo or methoxy groups,
c. alkenyl of 2 to 12 carbon atoms,
d. alkynyl of 3 to 12 carbon atoms,
e. phenyl,
f. phenyl substituted with halo, methyl, methoxy or nitro,
g. benzyl or
h. benzyl substituted with halo, methyl, methoxy or nitro;

Y is a heterocyclic radical selected from the group consisting of 2-furyl, 5-isothiazolyl, 1-methylpyrryl, 2-pyridyl, 2-pyrryl, 4-thiazolyl and 2-thienyl, and the acetoxy, chloro, methyl or nitro substituted derivatives of these;
R is hydrogen or methyl;
Z is halo, methyl, methoxy or nitro and
$n$ is an integer 0 to 3.

2. A compound according to claim 1 wherein R is hydrogen.

3. A compound according to claim 2 wherein X is $R^1O—$ wherein $R^1$ is alkyl of 1 to 12 carbon atoms.

4. A compound according to claim 2 wherein X is $R^1O—$ wherein $R^1$ is alkyl of 1 to 6 carbon atoms.

5. A compound according to claim 2 wherein X is methoxy.

6. Methyl 4-[2-(furfurylideneamino)phenyl]-3-thioallophanate.

7. Methyl 4-[2-(thenylideneamino)phenyl]-3-thioallophanate.

* * * * *